US009039539B2

(12) United States Patent
Flo et al.

(10) Patent No.: US 9,039,539 B2
(45) Date of Patent: May 26, 2015

(54) ARRANGEMENT FOR TRANSMITTING A TORQUE BETWEEN A SHAFT AND A HUB

(75) Inventors: Siamend Flo, Schwieberdingen (DE); Frank Nitsche, Remseck am Neckar (DE); Juergen Arnold, Marbach am Neckar (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/881,691

(22) PCT Filed: Aug. 30, 2011

(86) PCT No.: PCT/EP2011/064872
§ 371 (c)(1),
(2), (4) Date: Jul. 13, 2013

(87) PCT Pub. No.: WO2012/055611
PCT Pub. Date: May 3, 2012

(65) Prior Publication Data
US 2013/0281220 A1    Oct. 24, 2013

(30) Foreign Application Priority Data

Oct. 29, 2010  (DE) .......................... 10 2010 043 118

(51) Int. Cl.
*F16D 3/24*   (2006.01)
*F16D 3/18*   (2006.01)
*F16D 3/221*  (2006.01)

(52) U.S. Cl.
CPC ................ *F16D 3/185* (2013.01); *F16D 3/221* (2013.01)

(58) Field of Classification Search
USPC .................... 464/106, 139, 159; 418/182, 191
See application file for complete search history.

(56) References Cited

U.S. PATENT DOCUMENTS

| | | | | |
|---|---|---|---|---|
| 4,549,873 A | * | 10/1985 | Krude | 464/139 X |
| 5,738,586 A | * | 4/1998 | Arriaga | 464/106 |
| 2006/0240896 A1 | | 10/2006 | Ohashi et al. | |

FOREIGN PATENT DOCUMENTS

| | | | | |
|---|---|---|---|---|
| DE | 663 625 | * | 8/1938 | 464/153 |
| DE | 678 093 | * | 7/1939 | 464/106 |
| FR | 952 194 | | 11/1949 | |
| FR | 2 496 792 | | 6/1982 | |
| JP | 6-337018 A | | 12/1994 | |
| JP | 2002-40875 A | | 2/2002 | |

OTHER PUBLICATIONS

International Search Report corresponding to PCT Application No. PCT/EP2011/064872, mailed Nov. 29, 2011 (German and English language document) (5 pages).

* cited by examiner

*Primary Examiner* — Gregory Binda
(74) *Attorney, Agent, or Firm* — Maginot, Moore & Beck LLP

(57) ABSTRACT

An arrangement transmits a torque between a shaft and a hub. The hub has at least approximately the interior geometry of an equilateral n-sided polygon, the side surfaces of which at least approximately bear against a clutch portion, which is of circular overall cross section, of the shaft, and wherein the shaft has at least one driver portion which is rotationally conjoint with respect to the clutch portion and which extends in the direction of a corner of the n-sided polygon.

16 Claims, 4 Drawing Sheets

ARRANGEMENT FOR TRANSMITTING A TORQUE BETWEEN A SHAFT AND A HUB

This application is a 35 U.S.C. §371 National Stage Application of PCT/EP2011/064872, filed on Aug. 30, 2011, which claims the benefit of priority to Serial No. DE 10 2010 043 118.4, filed on Oct. 29, 2010 in Germany, the disclosures of which are incorporated herein by reference in their entirety.

BACKGROUND

The disclosure relates to an arrangement as described herein and to a gear-type fuel pump.

Arrangements for transmitting a torque between a shaft and a hub, e.g. for gear pumps, are known commercially in a large number of embodiments. For example, such arrangements have one or more locating pins. Inasmuch as the shaft and the hub are connected rigidly to one another thereby in all spatial directions, it is possible to transmit a relatively high torque but they cannot be used to compensate for tolerances between the input and the output. If, in other embodiments, the transition from the shaft to the hub is subject to play, it is possible to compensate for small angular misalignments between the shaft and the hub, for example, but it is generally necessary to accept considerable errors in coaxial alignment at the same time.

SUMMARY

The problem is solved by an arrangement as disclosed herein and by a gear-type fuel pump as disclosed herein. Advantageous developments are also described herein. Features that are important can furthermore be found in the following description and in the drawings, and the features may be important either alone or in various combinations, there being no need to mention this again explicitly.

The arrangement according to the disclosure has the advantage that a torque can be transmitted between a shaft and a hub, wherein the hub is centered precisely on the shaft and angular misalignments between the shaft and the hub can be compensated. This is advantageous, for example, if the hub comprises a gearwheel or is a gearwheel, in particular in the case of use in a gear-type fuel pump. Axial compensation between the shaft and the hub is furthermore possible. The arrangement according to the disclosure requires little installation space and is simple and economical to produce using standard components.

The hub according to the disclosure has at least approximately the interior geometry of an equilateral n-sided polygon. To match this, the shaft has a coupling portion of substantially circular cross section. At least one driver portion is arranged for conjoint rotation on the coupling portion and extends in the direction of one corner of the n-sided polygon of the hub. As a preferred but not compulsory option, the number of driver portions is greater than one, thus enabling the arrangement to be made radially symmetrical.

The arrangement is improved if the driver portion has the shape of a spherical cap. This is a simple way of reducing or even preventing point loads or notching effects, and of increasing the endurance of the arrangement.

One embodiment of the disclosure envisages that the driver portion is formed on a driver element, which is accommodated in an aperture in the coupling portion of the shaft. Using a driver element which projects above a surface of the coupling portion enables the coupling portion and the at least one driver element to be produced in a particularly simple and economical manner. The aperture is a radial bore or a groove in the coupling portion, for example.

As a complementary measure thereto, provision is made for the driver element to be pressed into the aperture. This enables the arrangement to be produced in a simple and economical manner while, at the same time, being robust.

Another simplified way of producing the arrangement is obtained if the driver element comprises a ball. This makes it possible to use a commercially available steel ball for the driver element, for example, with preferably more than half the volume of the ball being arranged in the coupling portion, i.e. being pressed or staked therein, for example.

The arrangement is further improved if the aperture is a blind hole and is dimensioned in such a way that approximately a third of the diameter of the ball projects above the coupling portion. As a result, the ball is anchored sufficiently firmly in the coupling portion and, at the same time, projects sufficiently to transmit the torque.

Another embodiment of the disclosure envisages that the arrangement has at least one driver portion for each corner of the n-sided polygon. This maximizes the potential of the arrangement since the torque is transmitted via all the corners of the hub and therefore a resulting total surface pressure can be minimized. This further improves the endurance of the arrangement.

Yet another embodiment envisages that the coupling portion comprises an encircling raised portion in the form of an annular bead. This makes it possible for the driver portions to project a relatively long way beyond the diameter of the shaft, thereby increasing the possibility of compensating for tolerances between the shaft and the hub or between the axes of rotation thereof. Moreover, it is thereby possible to provide particularly good tolerance of angular misalignments.

The possibilities for the arrangement are extended if the bead has a cross-sectional contour at least approximately in the form of a circular segment, in particular if it is formed by a spherical contour passing through the cylindrical shaft. It is thereby possible to compensate for any angular tolerances in a particularly effective manner, with the surface pressure between the driver portions and the shaft and/or local material stresses in other regions of the arrangement being minimized.

One use of the disclosed arrangement concerns a gear-type fuel pump, having a shaft and a gearwheel with a hub, wherein the gearwheel is connected to the shaft by means of an arrangement as described herein. Relatively stringent requirements in relation to leaktightness and endurance are generally imposed on gear-type fuel pumps. Moreover, gear-type fuel pumps are frequently embodied as separate devices which are mounted on a shaft emerging from a machine housing or engine housing, for example. Any axial and/or angular tolerances can be compensated for by the arrangement according to the disclosure in a particularly effective manner.

BRIEF DESCRIPTION OF THE DRAWINGS

Illustrative embodiments of the disclosure are explained below with reference to the drawings, in which.

DETAILED DESCRIPTION

The same reference signs are used for functionally equivalent elements and dimensions in all the figures, even where the embodiments are different.

Figure 1:
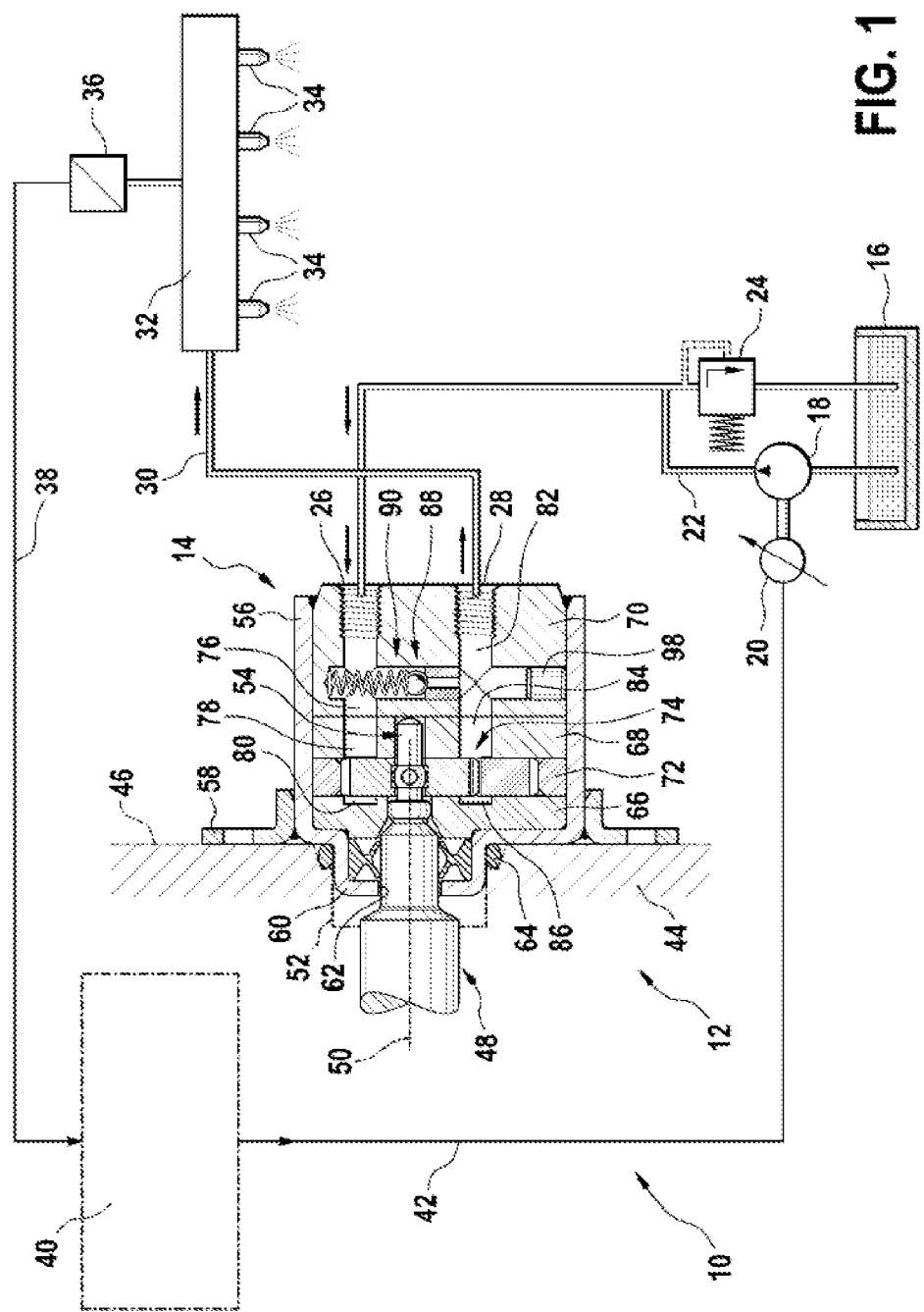
FIG. 1 shows a diagram of a fuel injection system of an internal combustion engine having a gear-type fuel pump.

A fuel injection system, denoted overall by reference sign 10 in FIG. 1, for supplying an internal combustion engine 12 with fuel comprises an external gear pump 14.

The fuel injection system 10 has a storage tank 16 for storing fuel. With the aid of a pre-feed pump 18, which is preferably driven by means of a driving device that can be regulated, in particular in the form of an electric motor 20, fuel is pumped from the storage tank 16 into a low-pressure line 22. The use of a driving device that can be regulated for the pre-feed pump 18 enables the delivery rate of the fuel injection system 10 to be adjusted, thereby making it possible to reduce delivery losses resulting from the delivery of an excess quantity of fuel, which then has to be returned to the storage tank 16.

To limit the fuel pressure in the low-pressure line 22, a low pressure limiting valve 24 is provided, by means of which fuel is returned to the storage tank 16 from the low-pressure line 22 when a specifiable maximum pressure is exceeded.

The low-pressure line 22 leads into an inlet 26 of the external gear pump 14. Said pump subjects the fuel supplied via the inlet 26 to high pressure. The fuel under high pressure flows via an outlet 28 of the external gear pump 14 to a high-pressure line 30, which leads to a fuel header in the form of a rail 32. The rail 32 supplies injection valves 34 with pressurized fuel. The injection valves 34 are each assigned to one of the combustion chambers of the internal combustion engine 12 and allow direct injection of the fuel into the combustion chambers.

The pressure in the rail 32 is detected with the aid of a pressure sensor 36. A voltage signal corresponding to the pressure detected can be fed to a control unit 40 with the aid of a data line 38. The control unit 40 is coupled by means of a control line 42 to the electric motor 20.

The internal combustion engine 12 comprises an internal combustion engine housing 44, e.g. in the form of a cylinder head, only part of which is shown. The internal combustion engine housing 44 has an outward-facing housing surface 46. The internal combustion engine 12 furthermore comprises a shaft, in particular in the form of a camshaft, which is mounted in such a way on the internal combustion engine housing 44 that it can rotate about a shaft axis 50 and which forms a drive shaft 48 for the external gear pump 14. As an alternative, the drive shaft 48 can be formed by a shaft that is separate from a shaft of the internal combustion engine 12.

The internal combustion engine housing 44 is provided with a housing opening 52, through which the drive shaft 48 passes, with the result that one shaft end 54 extends beyond the housing surface 46 into the surroundings of the internal combustion engine 12.

The external gear pump 14 has a pot-shaped external housing 56, which is connected, in particular with the aid of a welded-on flange 58, to the internal combustion engine housing 44, e.g. by means of a screwed joint. The external housing 56 has a housing projection 60, which extends in the direction of the internal combustion engine 12 and is inserted into the housing opening 52 of the internal combustion engine 12. The housing projection 60 has a housing opening 62 of circular cross section, which allows the drive shaft 48 to pass through.

The external housing 56 of the external gear pump 14 and the internal combustion engine housing 44 are sealed off from one another with the aid of an annular seal 64.

A plurality of housing parts is arranged in the external housing 56, namely a first housing part 66, a second housing part 68, spaced apart therefrom, and a third housing part 70, which acts as a housing cover. The third housing part 70 is welded to the external housing 56. It is preferred if the housing parts 66, 68 and 70 have flat surfaces parallel to one another, said flat surfaces of the housing parts thus forming metal sealing surfaces. In this case, the third housing part 70 can be used to produce a sealing force which presses housing parts 66 and 68 into the external housing 56.

Arranged axially between the first housing part 66 and the second housing part 68 is a housing ring 72, in which a gearwheel arrangement 74 is arranged. The gearwheel arrangement 74 forms the actual delivery unit of the external gear pump 14. The gearwheel arrangement 74 is mounted axially between the first housing part 66 and the second housing part 68. The housing ring 72 serves to provide radial support for the gearwheel arrangement 74.

On the low-pressure side, the external gear pump 14 has a low-pressure duct 76, which is connected to the inlet 26 and which is formed in the third housing part 70. The low-pressure duct 76 ends at a kidney-shaped intake opening 78, which is formed in the second housing part 68. The first housing part 66 has a mating kidney-shaped opening 80 corresponding in shape to the kidney-shaped intake opening 78.

On the discharge side, the external gear pump 14 comprises a high-pressure duct 82, which is connected to the outlet 28 and which is formed in the third housing part 70. The high-pressure duct 82 is connected to a kidney-shaped discharge opening 84, which is formed in the second housing part 68. A mating kidney-shaped opening 86 corresponding in shape to the kidney-shaped discharge opening 84 is arranged in the first housing part 66. The mating kidney-shaped openings 80 and 86 are used to ensure that the gearwheel arrangement 74 is subjected uniformly to pressure from both sides.

The external gear pump 14 furthermore comprises a pressure limiting valve 88, by means of which a fluid connection between the high-pressure duct 82 and the low-pressure duct 76 can be established when a specifiable operating pressure is exceeded. The pressure limiting valve 88 is arranged in a connecting duct 90, which extends between the high-pressure duct 82 and the low-pressure duct 76. The pressure limiting valve 88 has a valve seat pressed into the connecting duct 90, a valve body interacting with the valve seat, and a valve spring, which presses the valve body against the valve seat. In the drawing of FIG. 1, the valve seat, the valve body and the valve spring are shown without reference signs. The connecting duct 90 is in the form of a blind hole and is sealed at the open end thereof with the aid of a press-fitted plug 98.

Integrating the inlet 26, the outlet 28 and the pressure limiting valve 88 into the third housing part 70 makes it possible largely to dispense with additional sealing elements and thus allows a further reduction in the number of components of the external gear pump 14.

The external gear pump 14 described in FIG. 1 has a shaft-hub connection similar to the FIGS. 2 to 5 below.

Figure 2:
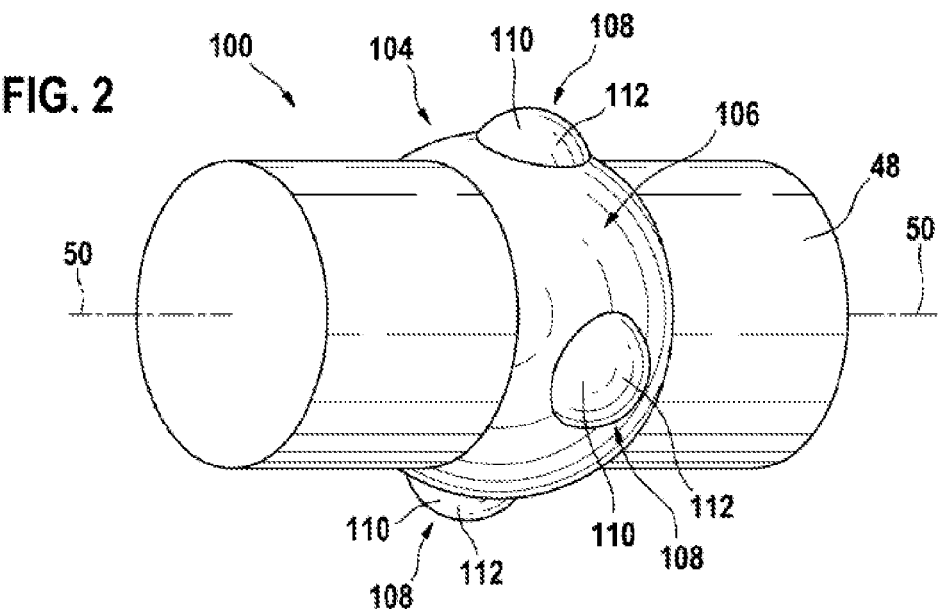
FIG. 2 shows a perspective view of a shaft of the gear-type fuel pump in FIG. 1 with a coupling portion.

FIG. 2 shows an arrangement 100 having a shaft 48—e.g. the drive shaft 48 in FIG. 1—having the basic geometrical shape of a cylinder. A hub 102 belonging to the arrangement 100 is shown only in FIG. 5. The shaft 48 is mounted in such a way that it can rotate about the shaft axis 50—by means of bearings, which are not shown in FIG. 2. In a central area of the drawing, the shaft 48 has a coupling portion 104 with a circular axial cross section. In the present case, the coupling portion 104 has a spherical contour 106 in the form of an annular bead passing through the cylindrical shaft 48. Four driver portions 108, which are each formed on a driver element 110, are arranged in a radially symmetrical manner around the coupling portion 104. The driver elements 110 each comprise a ball 112 and are arranged in a manner fixed in terms of rotation relative to the coupling portion 104. In the drawing of FIG. 2, only three of the four driver portions 108 are visible.

Figure 3:
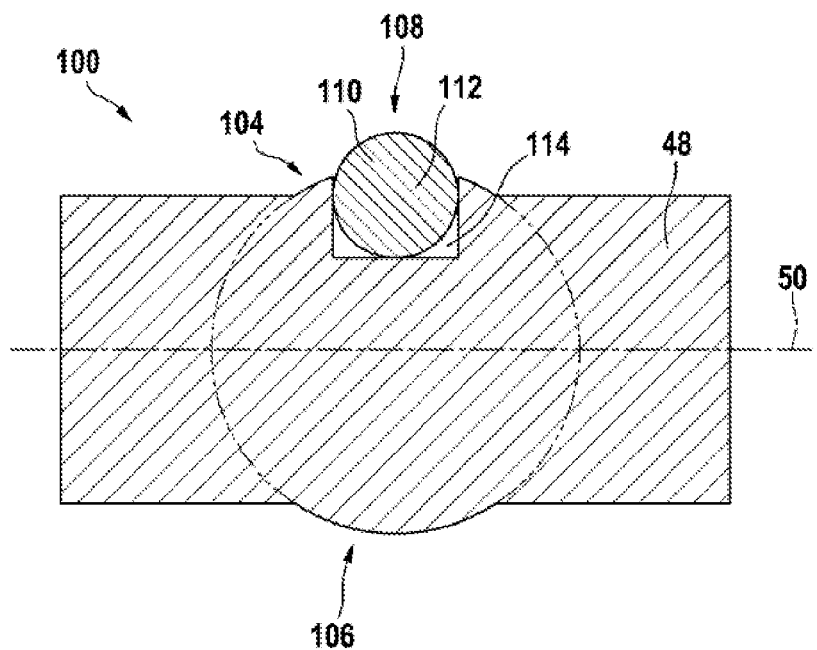
FIG. 3 shows a longitudinal section through the shaft in FIG. 2.

FIG. 3 shows a longitudinal section through the shaft along the shaft axis 50. The upper area of the drawing of FIG. 3 shows an aperture 114 in the coupling portion 104, into which the driver element 110, which is designed as a ball 112, is pressed. In the present case, the aperture 114 is a blind hole, which is dimensioned in such a way that approximately a third of the diameter of the ball 112 projects above the coupling portion 104. The driver portion 108 is thus in the form of a spherical cap. In the lower area of the drawing of FIG. 3, the driver element 110 situated there is not shown in order to illustrate the cross section of the spherical contour 106 fully (in chain-dotted lines).

Figure 4:
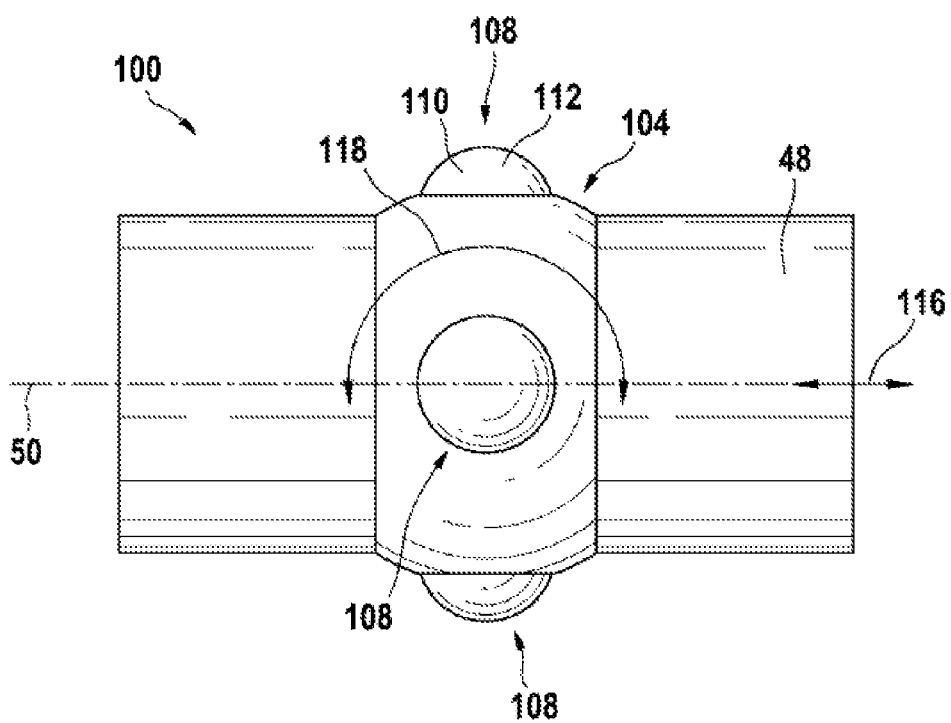
FIG. 4 shows a side view of the shaft in FIG. 2.

FIG. 4 shows a side view of the shaft 48 in FIG. 2. As a supplement to FIG. 2, two arrows 116 and 118 are included, illustrating the possible degrees of freedom for an axial tolerance compensation or angular compensation of the shaft 48.

Figure 5:
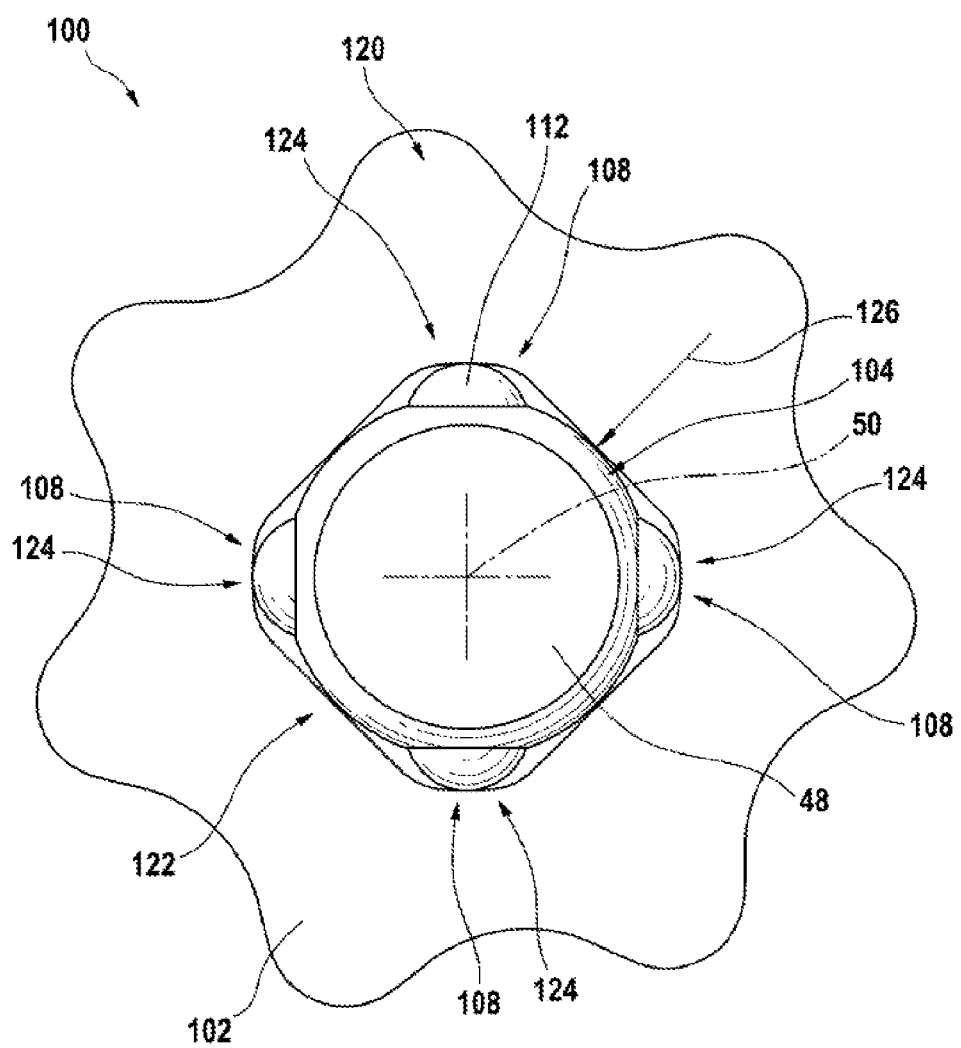
FIG. 5 shows an axial view of the shaft in FIG. 2 together with a schematic illustration of a hub.

FIG. 5 shows the arrangement 100 having the shaft 48 and the hub 102. In the present case, the hub 102 is a rotor 120 of a G-rotor pump. The hub 102 has the interior geometry of an equilateral n-sided polygon 122, with the n-sided polygon 122 in the present case being a square and having four greatly rounded corners 124.

It can be seen that the four side faces of the n-sided polygon 122 bear approximately against the coupling portion 104. This is indicated in the drawing by an arrow 126. The hub 102 is thereby centered on the shaft 48 and, at the same time, a tilting movement between the shaft 48 and the hub 102 by an angle dependent on the specific embodiment is permitted.

It can furthermore be seen that the four driver portions 108 or driver elements 110 designed as balls 112 each extend in the direction of one corner 124 of the n-sided polygon 122. In the present case, a radius of the corner 124 is larger than the radius of the driver element 110 engaging in the corner 124. However, it is likewise possible for the radius of the corner 124 to be smaller than the radius of the driver element 110.

Through matching dimensioning of the coupling portion 104 and of the interior geometry of the n-sided polygon 122 and of the respectively resulting degrees of freedom, the arrangement 100 can be optimized in respect of the power-transmitting surfaces and in respect of axial tolerances and/or angular tolerances that can be expected. For this purpose, the number of corners 124 and/or the rounding of the corners 124 and/or the diameter of the balls 112 and/or the radial length of the apertures 114 and/or the diameter of the coupling portion 104 can be different from that illustrated in FIGS. 2 to 5, for example.

During operation, the shaft 48 rotates about the shaft axis 50. During this process, the shaft 48 transmits a torque to the hub 102. The balls 112, of which there are four in the present case, are preferably standard commercially available components.

It is also possible to perform the transmission of the torque between the shaft 48 and the hub 102 with just three, two or even with just one driver element 110. The driver elements 110 are preferably arranged in a radially symmetrical manner. It is furthermore also possible to embody the interior geometry of the hub 102 as an equilateral triangle, pentagon etc., instead of a square. This opens up additional possibilities for matching the magnitude of the torque that can be transmitted on an enduring basis, on the one hand, and any tolerances, on the other hand.

It can furthermore be seen that the arrangement 100 in FIGS. 2 to 5 requires little or no additional installation space. As a result, the arrangement 100 is particularly versatile.

The invention claimed is:

1. A torque transmission arrangement comprising:
   a hub defining at least approximately an interior geometry of an equilateral n-sided polygon having side surfaces;
   a shaft including (i) a coupling portion defining a circular overall cross section, (ii) at least one driver portion rotationally fixed relative to the coupling portion and extending in a direction of one corner of the n-sided polygon, and (iii) a driver element accommodated in an aperture in the coupling portion of the shaft,
   wherein the side surfaces of the n-sided polygon at least approximately bear against the coupling portion of the shaft;
   wherein the arrangement is configured to transmit a torque between the shaft and the hub; and
   wherein the at least one driver portion has a shape of a spherical cap and is defined on the driver element.

2. The torque transmission arrangement as claimed in claim 1, wherein the driver element is pressed into the aperture.

3. The torque transmission arrangement as claimed in claim 1, wherein the driver element includes a ball.

4. The torque transmission arrangement as claimed in claim 3, wherein the aperture includes a blind hole having dimensions such that approximately one third of a diameter of the ball extends from the coupling portion.

5. The torque transmission arrangement as claimed in claim 1, wherein the shaft includes at least one driver portion for each corner of the n-sided polygon.

6. The torque transmission arrangement as claimed in claim 1, wherein the coupling portion includes an encircling raised portion defined by an annular bead.

7. The torque transmission arrangement as claimed in claim 6, wherein the annular bead has a cross-sectional contour at least approximately in the form of a circular segment.

8. The torque transmission arrangement as claimed in claim 7, wherein:
   the shaft has a cylindrical shape, and
   the annular bead is defined by a spherical contour passing through the shaft.

9. A gear-type fuel pump, comprising:
   a shaft; and
   a gearwheel having a hub,
   wherein the gearwheel is connected to the shaft by a torque transmission arrangement configured to transmit a torque between the shaft and the hub,
   wherein the hub defines at least approximately an interior geometry of an equilateral n-sided polygon having side surfaces,
   wherein the shaft includes (i) a coupling portion defining a circular overall cross section, (ii) at least one driver portion rotationally fixed relative to the coupling portion and extending in a direction of one corner of the n-sided polygon, and (iii) a driver element accommodated in an aperture in the coupling portion of the shaft,
   wherein the side surfaces of the n-sided polygon at least approximately bear against the coupling portion of the shaft, and
   wherein the at least one driver portion has a shape of a spherical cap and is defined on a driver element.

10. The gear-type fuel pump of claim 9, wherein the driver element is pressed into the aperture.

11. The gear-type fuel pump of claim 9, wherein the driver element includes a ball.

12. The gear-type fuel pump of claim 11, wherein the aperture includes a blind hole having dimensions such that approximately one third of a diameter of the ball extends from the coupling portion.

13. The gear-type fuel pump of claim 9, wherein the shaft includes at least one driver portion for each corner of the n-sided polygon.

14. The gear-type fuel pump of claim 9, wherein the coupling portion includes an encircling raised portion defined by an annular bead.

15. The gear-type fuel pump of claim 14, wherein the annular bead has a cross-sectional contour at least approximately in the form of a circular segment.

16. The gear-type fuel pump of claim 9, wherein:
the shaft has a cylindrical shape, and
the annular bead is defined by a spherical contour passing through the shaft.

* * * * *